Nov. 10, 1942.   R. A. RODRICK   2,301,584

SIGNAL DEVICE

Filed Oct. 11, 1940   3 Sheets-Sheet 1

INVENTOR.
RAYMOND A. RODRICK.
BY Donald W. Farrington
ATTORNEY

Nov. 10, 1942.  R. A. RODRICK  2,301,584

SIGNAL DEVICE

Filed Oct. 11, 1940  3 Sheets-Sheet 2

INVENTOR.
RAYMOND A. RODRICK.
BY Donald W. Farrington
ATTORNEY.

Nov. 10, 1942.       R. A. RODRICK       2,301,584
SIGNAL DEVICE
Filed Oct. 11, 1940       3 Sheets-Sheet 3

INVENTOR.
RAYMOND A. RODRICK.
BY
ATTORNEY.

Patented Nov. 10, 1942

2,301,584

UNITED STATES PATENT OFFICE 2,301,584

SIGNAL DEVICE

Raymond A. Rodrick, Akron, Ohio

Application October 11, 1940, Serial No. 360,810

8 Claims. (Cl. 177—337)

This invention relates to a signal device and more particularly to an improvement in signal devices for automobiles of the type disclosed in my copending application Serial No. 285,585, filed July 20, 1939.

It is among the objects of my invention to provide a signal device which will include signal light units at the rear of the vehicle so as to indicate the intention of the driver with respect to the continued progress of the vehicle, whether to left or right, and whether or not acceleration or deceleration condition is to be established.

It is a further object of my invention to provide a signal device according to the preceding object that will include a switch box for the signal lights that may be conveniently mounted on the floor of the driver's compartment and be operated in conjunction with the foot pedal which is ordinarily used to open and close the throttle.

It is a further object of my invention to provide a signal device according to the preceding objects, wherein a tilting of the foot pedal for the throttle about one axis will light a signal light, indicating throttle opening or closing condition and a tilting of the foot pedal about another axis will indicate the driver's intention with respect to directional progress of the vehicle.

It is a further object of my invention to provide a signal device according to the preceding object, wherein the signal light which indicates directional progress of the vehicle is also controlled or limited by that movement of the foot pedal which indicates the forward progress of the vehicle.

As will be understood from the disclosure of my copending application above referred to, I have therein provided a directional signal light system and a signal light system indicating throttle-opening conditions, both of which are controlled and operated by a single foot pedal.

One of the important advantages and improvements of my invention is an arrangement whereby the directional signal light may be operated by tilting the foot pedal about one axis and the current flowing through such directional signal light will be automatically interrupted by a foot throttle movement about another axis.

It will be understood by those familiar with this art that as the driver of the vehicle approaches a corner where it is intended to make a right-hand turn, and he so operates the signal light device to indicate a turn, it is important that as soon as the turn is negotiated the signal light indicating the turn be rendered inoperative.

Numerous signal devices heretofore provided for use in motor vehicles have resulted in arrangements which require conscious and voluntary effort on the part of the operator to interrupt the directional signal light after a turn has been effected. Failure on the part of the operator to shut off or otherwise render inoperative the directional signal light, after a turn has been made, results in the vehicle proceeding down the highway and indicating a turn long after the turn has been made. Danger attendant upon an arrangement which requires conscious and voluntary action on the part of the operator have resulted in the prohibition in certain states of the use of signal lights of this type.

According to my invention, the signal light device is operated so as to indicate a turn and thereafter as the turn is being effected, the normal accelerating action by the operator automatically interrupts the directional signal so that no conscious or voluntary effort on the part of the operator is required to interrupt the directional signal light. This action is accomplished according to my invention by an interlocking arrangement between the switch parts which operate the lights indicating throttle opening and the switch parts which operate the directional signal lights.

Further objects and advantages relating to simplicity in construction, economies in manufacture and safety in operation of the vehicle will be found in the following description and the appended drawings, wherein.

Figure 1:
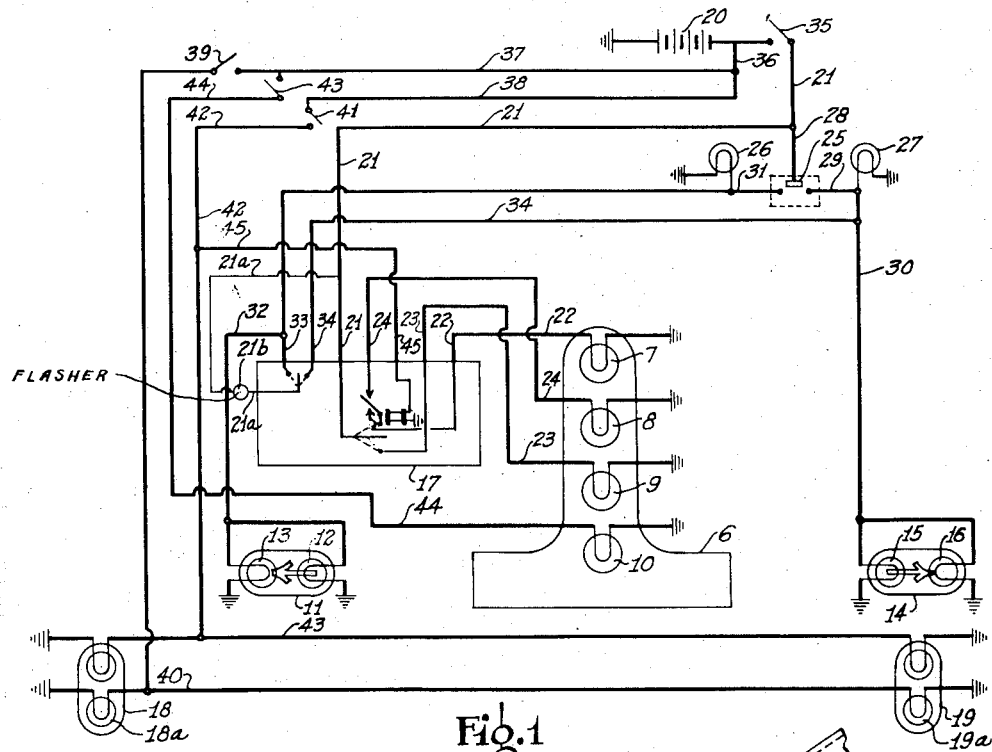
Figure 1 is a wiring diagram for a signal light system made according to my invention.

In the preferred form of my invention, which is illustrated in the drawings, a signal light unit indicated in its entirety as at 6 in Figure 1, is mounted in the rear or incorporated in the rear portion of the vehicle and comprises four lights 7, 8, 9 and 10, vertically arranged; the top light 7 being a red light to indicate that the vehicle is coming to a stop or that the brakes have been applied; the light 8, therebelow, being yellow and indicating caution or deceleration of the vehicle; the light 9 being a green light and indicating a throttle opening or accelerating condition of the vehicle and the lower light 10 being a white light to illuminate the license plate of the vehicle, which may be mounted therebeneath.

At the left hand side of unit 6 is a directional light unit indicated in its entirety as at 11, which includes a light 12 to illuminate an arrow pointing to the left and a light 13 to illuminate a section adjacent the arrow.

A unit similar to the unit 11, as at 14, is mounted at the right hand side of the vehicle and this unit also includes two lights 15 and 16.

A switch box is diagrammatically shown in Figure 1 as at 17. The switch box it will be understood as the description proceeds carries the switching elements designed to establish the current flow to the various lights of my signal system.

The wiring system may include the conventional stop lights at each side of the rear of the vehicle as at 18 and 19.

The automobile storage battery is indicated as at 20 and a line 21 leading from the storage battery enters the switch box. Inasmuch as this line is the main source of current for my signal system, it will be referred to as the hot line into the switch box.

A line 21a is tapped on a line 21 adjacent the switch box and leads into the switch box through a flasher unit 21b. The flasher unit is connected into that portion of the switch mechanism which operates the directional signals and thus the current leading from the battery to the directional signals is automatically interrupted at intervals so that the directional signals will flash on and off at regular intervals while they are in operation. The flasher unit 21b may be of any conventional type available for low voltage direct current such as is employed in devices of this character.

A line 22 leads from the switch box to the red light 7, a line 23 leads from the switch box to the green light 9 and a line 24 leads from the switch box to the yellow light 8.

I have indicated, as at 25 in Figure 1, a hand-operated switch which may be conveniently placed on an instrument panel of the automobile and which is in the light circuit controlling the directional signal lights. This switch is provided so that the operator may by hand operate either one of the directional signal lights 11 or 14.

Tell-tale or pilot lights 26 and 27 are also carried on the instrument panel and indicate to the operator the condition of the directional lighting system.

A line 28 tapped from the hot line 21 leads to the manual switch 25 and by operation of the hand switch either to the left or right, current is directed through the line 29 and thence through 30 to the right hand directional signal 14 or through the line 31 thence through 32 to the left hand signal 11.

When the directional signal lights are operated by the switch mechanism in the main switch box 17, the current is led out of the switch box through line 33 and thence to the left hand signal 11 or out of the switch box through line 34 and thence through line 30 to the right-hand directional light 14.

A hot line 21 leading to the hand-operated switch 25 and to the foot-operated switch mechanism in 17 may be controlled by a separate switch indicated at 35.

The conventional red stop lights 18a and 19a at the rear of the vehicle are provided with the usual wires leading from the battery as at 36 and 37.

The switch 39 in line 37, being in the same circuit as the headlight system of the vehicle, maintains a constant red light through line 40. The switch 41 in line 38 is preferably connected to the foot brake so that a bright red stop light is operated through line 42 whenever the foot brake is applied.

Switch 43 connects line 37 with a line 44 which leads to the white light 10, adapted to illuminate the license plate. A line 45 runs from the line 42 into the switch box where it is utilized in connection with the yellow or caution light as more fully described hereinafter.

Figure 2:
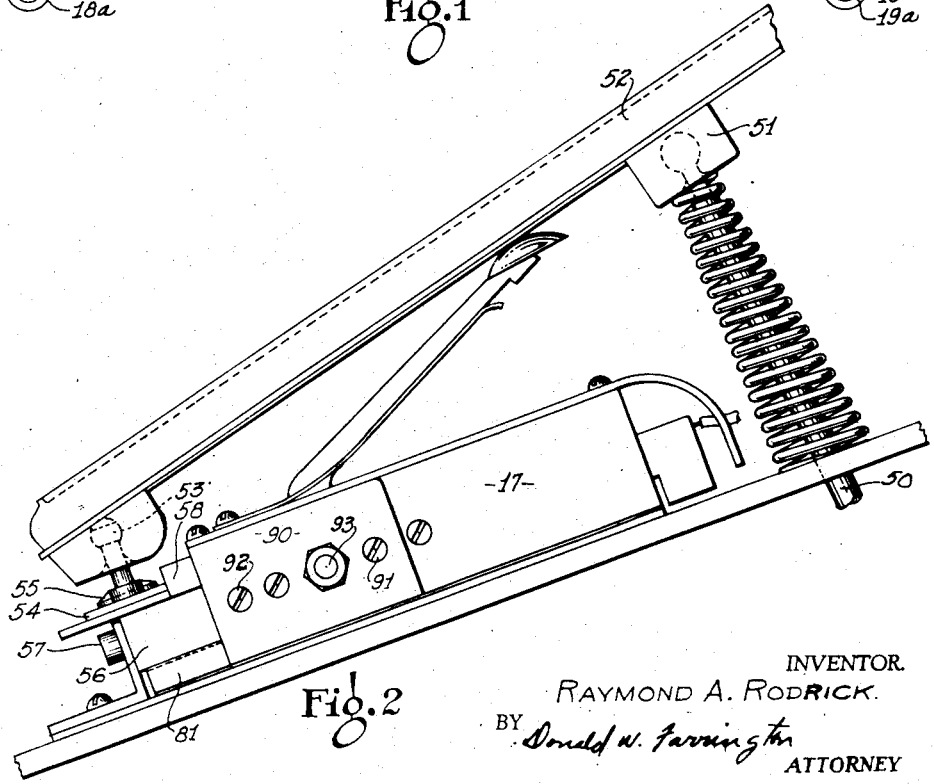
Figure 2 is an elevation showing the arrangement of the signal light switch box on the floor board of an automobile with the foot pedal which operates the automobile throttle mounted on the switch box.

Referring to Figure 2, the throttle rod 50 projects through the floor board of the vehicle and is connected as at 51 by a ball and socket joint to the foot pedal 52. The rear end of the foot pedal 52 is connected through spaced ball and socket joints 53—53 to a plate member 54. The member 54 is in turn pivoted as at 55 to a block 56 which is journaled on the pin 57 for rotational movement about the axis of the pin 57. The block 56 is provided on its upper surface as at 58 with a fork or yoke member adapted to receive a pin 59.

From the construction just described, it will be understood that the foot pedal 52 may rock on the ball and socket joints 53 for accelerating and decelerating movement of the pedal and at the same time the pedal in its entirety may be rocked about the axis of the pin 57. The rocking movement of the pedal about the pin 57 is carried through the members 56 and 58 and thence through the pin 59 to the switch parts within the switch box 17 so as to operate the directional signal lights.

A switch operating arm 60 projects outwardly through a slot 61 in the switch box and is provided with a rounded end portion 62 designed to bear against the under side of the foot pedal 52. The arm 60 is normally urged upwardly against the foot pedal by a spring 63. The switch arm 60 is pivoted within the switch box and it will be observed that the arrangement is such that the switch arm 60 follows the foot pedal travel up and down as the foot pedal is rocked on the ball and socket joints 53—53.

It will also be understood as this description proceeds that switch elements within the switch box 17 are operatively connected to the arm 60 so that the depressing or accelerating movement of the pedal 52 will light the green light 9 and an upward or decelerating movement of the foot pedal 52 will light the yellow or caution light 8.

Figure 12:
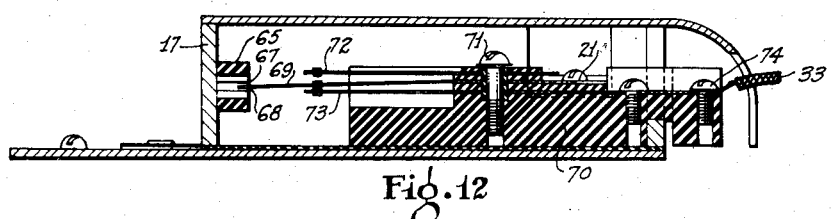
Figure 12 is a longitudinal sectional view taken along the line 12—12 of Figure 3.
Figure 13:
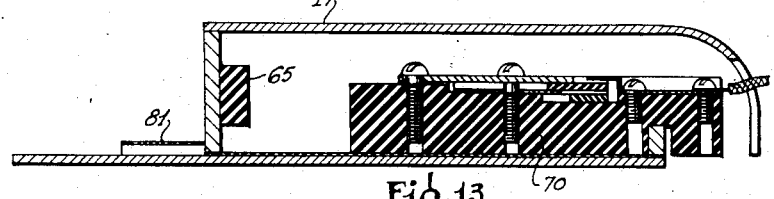
Figure 13 is a longitudinal sectional view taken along the line 13—13 of Figure 3.
Figure 14:
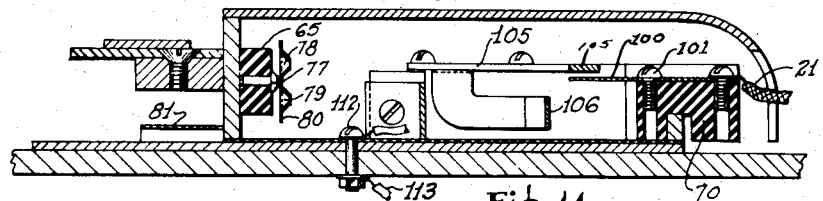
Figure 14 is a longitudinal sectional view taken along the line 14—14 of Figure 3.
Figure 15:
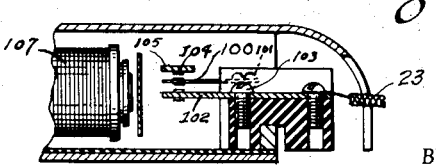
Figure 15 is a sectional view with parts broken away, taken on the plane indicated at 15—15 of Figure 3.

At the rear end of the switch box, and pivotally carried on the end of the pin 57 within the switch box, is an arm 65 formed of hard rubber or other non-conducting material, which is provided at its outer end 66 with a slot or fork 67 which is adapted to embrace the end portion 68 of a flexible metal strip 69. One end of the strip 69 is anchored as shown in Figure 12 to a block of insulating material 70 by means of a screw 71. Metal strips 72 and 73 are insulated with respect to each other and mounted on the block 70 in alignment with the strip 69 (see Figure 12). The members 72 and 73 are provided with contact points in alignment with a contact point carried by the strip 69 and thus when the strip 69 is flexed, as shown in Figure 12, current may flow through the strip 69 into the strip 73 and thence to the terminal 74 and the wire 33 which leads to the left directional signal light 11. The strip 69 is flexed to effect this action by the rocking of the member 65 through its pin connection 59—58.

When the foot pedal is rocked about the axis of the pin 57 to the right, the member 65 flexes the strip 69 upwardly so as to interrupt the connection to strip 73 and to establish a connection with the strip 72. Current flowing through the strip 69 thence through strip 72 is led out of the switch box through the strip 75 and thence to the wire 34 leading to the right directional signal. The current is led into the flexible strip 69 through the hot line 21a and thus it will be understood the strip 69 may be flexed upwardly or downwardly to light either one of the directional signal lights or may assume a neutral position between the strips 72 and 73, wherein neither of the directional signal lights is operated.

The member 65 which actuates the directional signal lights as above described, is provided on a vertical face thereof with a projection 77 and this projection 77 is adapted to be moved into alignment with either of two recesses 78 and 79, which are formed in a flexible metal strip 80 secured as at 82 to the side wall of the switch box. The member 80 is normally resiliently urged toward the projection 77 so that it tends to hold the member 77 and its carrying block 65 in either of the recesses 78 or 79. For instance, if the foot pedal is rocked to the left and the projection 77 is in a lowered position, the member 79 tends to hold the member 65 in said lowered position.

Figure 5:
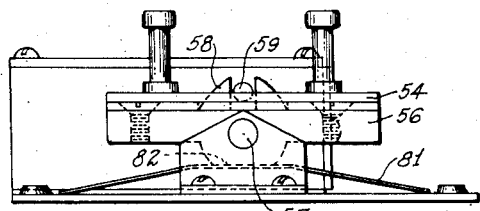
Figure 5 is an end elevation taken as indicated by lines 5—5 of Figure 3.
Figure 6:
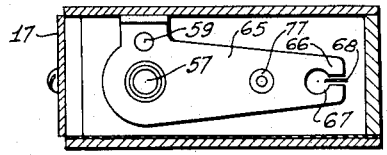
Figure 6 is a transverse section through the switch box as indicated by line 6—6 of Figure 3.
Figure 7:
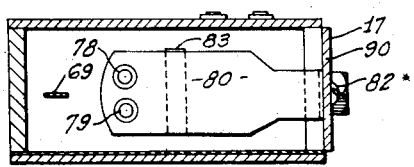
Figure 7 is a transverse sectional view taken on the plane indicated at 7—7 of Figure 3.

A leaf spring 81 is mounted beneath the member 56 (see Figure 5) so that it bears against a flattened portion 82 on the member 56 and constantly tends to restore the member 56 to its horizontal position as shown in Figure 5. The member 56, however, may be restrained from assuming its normal horizontal position by the latching effect of the member 80 and its two recesses 78—79.

An angular bracket 83 is secured to the member 80 and this bracket is provided with a wire clip 85 having downturned end 86 fitted into a recess 87 on a pin 89. The pin 89 is actuated by the switch-operating arm 60 and thus when the arm 60 is depressed by the foot pedal, the pin 89 is turned forwardly and by its forward movement pulls the member 80 forwardly so as to unlatch the member 80 from the projection 77.

Figure 4:
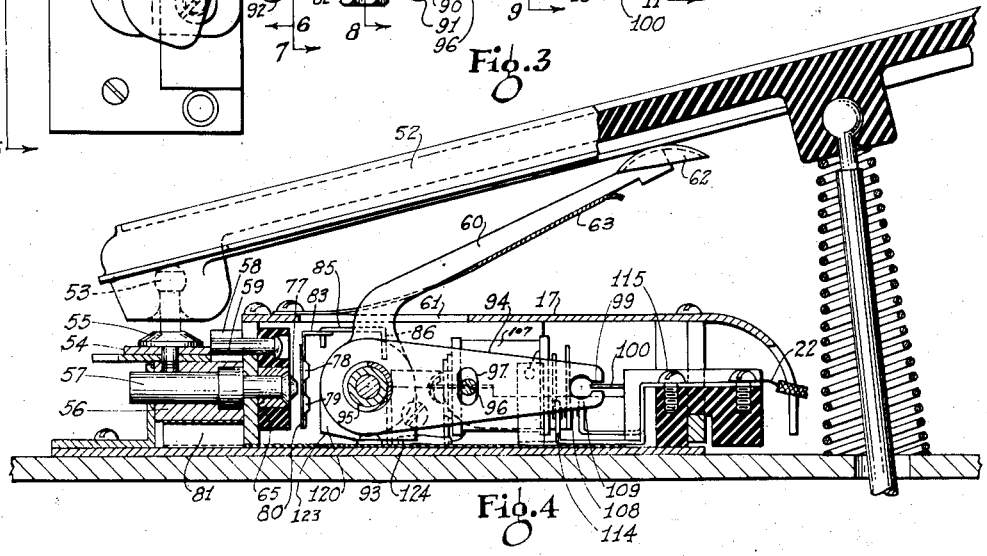
Figure 4 is an elevation with parts in section, taken through the switch box.
Figure 8:
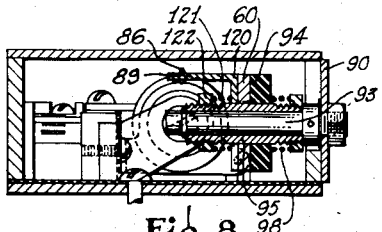
Figure 8 is a transverse sectional view taken along the plane indicated at 8—8 in Figure 3.
Figure 9:
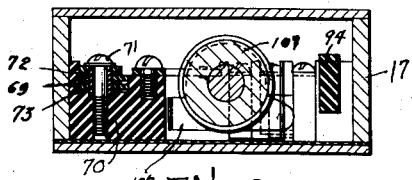
Figure 9 is a transverse sectional view taken along the line 9—9 of Figure 3.
Figure 10:
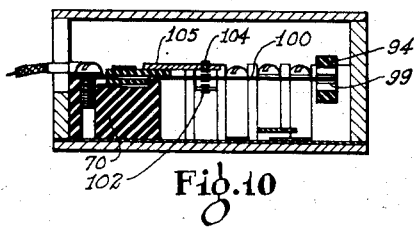
Figure 10 is a transverse sectional view taken along the plane indicated at 10—10 in Figure 3.
Figure 11:
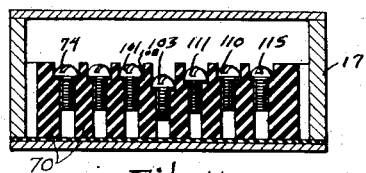
Figure 11 is a sectional view showing the terminal connections in the switch box as indicated in 11—11 of Figure 3.

As shown in Figure 8, a disc 120 is mounted for a limited rotational movement on the sleeve 95 and one flat face of this disc bears against the pivoted portion of the member 60. The disc 120 is resiliently urged against the face of the member 60 by a coil spring 121 maintained on the sleeve by a nut 122. The pin 89 projects laterally from the disc last named and is provided with the recess 87 to receive the wire clip 86. The disc 120 is preferably shaped at its lower side as shown in Figure 4 so that the disc is limited in its pivotal movement by the cam faces 123 and 124. Whenever the member 60 is rocked forwardly, the disc 120 is frictionally rocked therewith as permitted by the face 124 and whenever the member 60 is moved upwardly as in deceleration movement, the disc 120 rocks rearwardly as limited by the face 123. This limited movement described is sufficient to control the member 80 and pull it in and out of latching engagement with the projection 77.

Thus it will be understood that after the directional signal light has been lighted by a rocking of the foot pedal about the axis of pin 57, it will remain in its lighted condition until it is unlatched by a depressing movement of the foot pedal.

Those familiar with the normal operation of a motor vehicle know that the foot pedal is raised somewhat so as to decelerate while making a turn and the pedal remains in decelerated position until the turn is partially negotiated and that as the turn is finally effected, the operator depresses the pedal so as to again accelerate.

I have utilized this normal operation of the foot pedal so as to automatically unlatch the directional signal soon after the turn has been made and at a time when the directional signal is no longer required. Thus the current flow through either directional signal is interrupted by an accelerating movement of the foot pedal which is the natural and normal mode of operation and requires no conscious or voluntary action by the operator.

It is possible, of course, for the operator to maintain the directional signal lighted during an acceleration of the vehicle by consciously and voluntarily holding the pedal tilted while making a turn. Unless there is a conscious and voluntary effort, however, on the part of the operator, the spring 81 will restore the pedal to its normal position as shown in Figure 5 and thus the directional signal will be rendered inoperative.

Coming now to that part of the switch mechanism which operates the red, yellow and green lights 7 to 9, inclusive, I have utilized a frictional switch arrangement generally similar to that employed in the device disclosed in my copending application above referred to. This mechanism includes a plate 90 which is secured to the main switch box 17 by screws 91 and 92. The plate 90 carries a pin 93 which projects laterally into the switch box. An arm 94 is journaled on the sleeve 95 carried by the pin for free rocking movement and is limited in its rocking movement by the screw-and-slot arrangement 96—97. The arm 94 is urged axially of the sleeve 95 against a face on the switch-actuating arm 60 by a coiled spring 98. This arrangement provides a slipping, frictional clutch between the arm 60 and the member 94 so that as the arm 60 is depressed by foot-pedal movement, the member 94 is moved therewith to the extent permitted by the screw-and-slot arrangement 96—97. Further movement in one direction of the arm 60 is ineffective to move the arm 94 beyond the limits provided by the screw-and-slot arrangement. The free end of the arm 94 is provided with a yoke or slot as at 99 to embrace a flexible metal strip 100.

Figure 3:
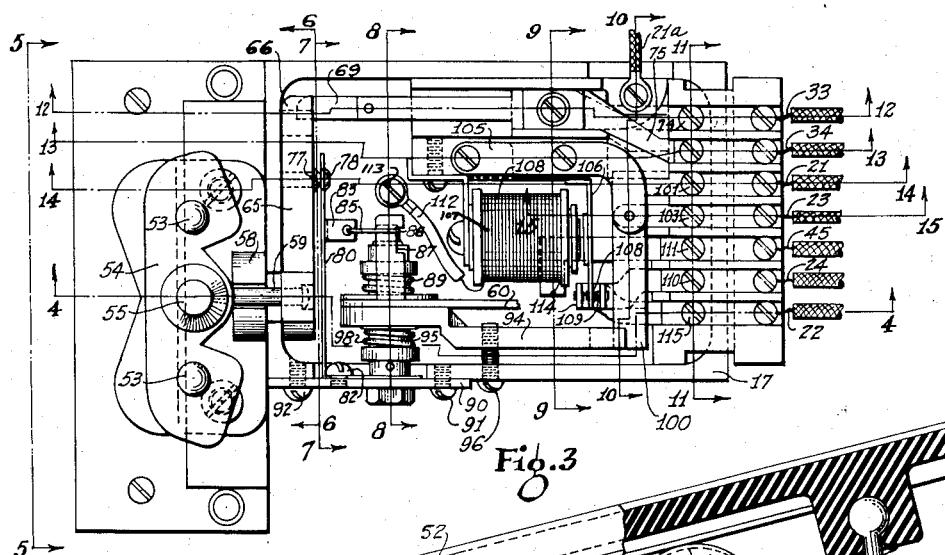
Figure 3 is a plan view of the switch box with the cover removed and parts broken away.

The member 100 is anchored at one end as at 101 to the block 70 and this anchored portion is connected to the hot wire 21 which leads to the battery. Whenever the switch-actuating member 60 is moved downwardly in response to accelerating movement of the foot pedal 52, the member 94 flexes the strip 100 downwardly and into contact with a member 102, which leads to the terminal 103 and thence outwardly of the switch box to wire 23 which leads to the green light 9. Upon a raising of the foot pedal 52, the member 94 is rocked upwardly and connects with a contact 104 carried by the member 105. The L-shaped member 105 (Figure 3) is mounted on the block 70 and is electrically connected to an arm 106 which overhangs the core of a solenoid 107. The free end of the member 106 carries a contact 108 normally bearing against a contact 109 which is electrically connected through the terminal 110 leading to the wire 24 and thence to the yellow or caution signal 8.

From the structure above described, it will be understood that whenever the vehicle is accelerated by depressing the pedal 52, an electrical circuit is established through the member 100 and thence through the wire 23 to light the green signal light 8 and that whenever the vehicle is decelerated the strip 100 moves upwardly to establish an electrical circuit from the strip 100 to the wire 24 and thence to light the yellow or caution signal.

The wire 45 which is tapped from the line 42 leads into the switch box and through the terminal 111, thence to the field winding of relay coil 107. One end of this wire leading to the field coil leads out of the switch box through wire 112 and thence to a ground 113. Whenever the switch 41, which is connected to the foot brake is closed, it establishes a flow of current in the solenoid or relay 107 and thus whenever the brake pedal is actuated by the operator, the relay 107 is energized. The effect of energizing the relay 107 is to pull the member 106 toward the coil 107 and break the circuit maintained through 108—109.

In addition to breaking the circuit through 108—109, just mentioned, the function of the relay is to establish a circuit through 108 to contact 114 which is electrically connected to terminal 115, leading through the wire 22 to the red light 7.

From the foregoing it will be understood that during a deceleration movement of the pedal 52, the yellow light will be maintained until the vehicle operator depresses the brake pedal so as to close the switch 41 and thereafter the current theretofore flowing through 108—109 to the yellow light will be directed through 108—114 to the red light. This insures that the yellow or caution light will remain on until the red or stop light 7 is lighted and that the two lights cannot be lighted at the same time.

In operation a signal device such as I have provided does not interfere with the normal operation of the vehicle and the only conscious or voluntary act on the part of the operator is the tilting of the foot pedal about the axis of the pin 57. Whenever the foot pedal 52 is depressed the member 60 is rocked downwardly and through the friction clutch arrangement between 60 and 94, member 100 is flexed to establish a flow of current to the green light 9. The green light 9 remains lighted as long as an accelerating or open-throttle condition is maintained. When, however, the foot pedal is raised, the member 60 moves upwardly therewith and through the initial portion of its upward travel moves the member 94 upwardly and establishes a circuit effective to light the yellow or caution light. The yellow or caution light will remain on during the deceleration position of the foot pedal, but as soon as the throttle is again depressed, the green light will again be lighted. In the event that the brake is applied during a decelerating movement, the solenoid or relay 107 will redirect the flow of current from the member 106 to the red light 7.

Throughout any of the accelerating or decelerating movement of the foot pedal 52, the pedal may be tilted about the axis of the pin 57 so as to light either of the directional signal lights. In the event the operator has tilted the pedal so as to light either of the directional lights to indicate a turn, the operator will normally decelerate while negotiating the turn and as soon as the turn is made will again move the pedal to an accelerating position. The last-mentioned action unlatches the member 80 so that the foot pedal is restored by spring 81 to its normal position shown in Figure 5.

It will be understood, however, that the operator may maintain the pedal tilted about the axis of pin 57 regardless of the acceleration or deceleration position of the switch-actuating member 60 by consciously maintaining a pressure through the foot pedal on either side of the axis of the pin 57.

Although I have described and shown the preferred embodiment of my invention in considerable detail, it will be understood by those skilled in the art that numerous changes may be made therein without departing from the scope of the invention as defined by the following claims.

I claim:

1. A signal light system for motor vehicles comprising a foot pedal mounted to rock about axes transverse with respect to each other, rocking movement of the pedal about one axis effective to move a throttle rod to open and closed positions, a switch box mounted beneath said pedal provided with a pair of movable switches, one switch operatively connected to the pedal being moved in response to throttle rod opening and closing movements and the other switch operatively connected to the pedal and moved in response to a rocking of the pedal about its other axis, a pair of direction-indicating lights, a pair of throttle rod-position-indicating lights, said throttle rod-indicating lights connected to said one switch for selective operation and said direction-indicating lights connected to the other switch for selective operation, and means operatively connecting said two switches whereby movement of said pedal about said one axis controls a movement of said pedal about said other axis.

2. A signal light system for motor vehicles comprising a foot pedal mounted to rock about axes transverse with respect to each other, rocking movement of said pedal about one axis effective to control the throttle rod, rocking movement of said pedal about said other axis effective to move a switch for operating direction-indicating signal lights, interlocking means connected to said switch operatively connected to said pedal constructed and arranged so that rocking of the pedal about said one axis controls said switch movement.

3. A signal light system for motor vehicles including a foot-operated pedal, said pedal mounted to rock about axes transverse with respect to each other, the rocking of said pedal about one axis in a downwardly direction establishing a circuit to light a green light, a rocking of said pedal about said one axis in an upward direction effective to establish a circuit to a yellow light, a rocking of said pedal about said other axis in one direction effective to light a directional signal light, a rocking of said pedal about said other axis in another direction effective to light a second direction-indicating light, means tending to maintain said pedal in a position intermediate said last-named rocked positions, latching means adapted to hold said pedal in either of said last-named rocked positions, said latching means moved to an unlatched position by a downwardly rocking movement of said pedal about said one axis.

4. A signal device for motor vehicles comprising a pedal adapted to be rocked on axes transverse to each other, a throttle rod connected to said pedal, said throttle rod moved to accelerating position by rocking the pedal downwardly about one axis, a direction-indicating light switch connected to said pedal and moved therewith by pedal rocking movement about another axis, a pair of throttle-position-indicating lights, a switch for said last-named lights operatively connected to the pedal, interlocking means interconnecting said two switches, whereby movement of the second switch is controlled by the movement of the first switch.

5. A signal device for motor vehicles comprising a foot pedal mounted to rock about axes transverse with respect to each other, a switch box mounted beneath said pedal, a pair of switches in said switch box, one of said switches actuated by rocking movement of said pedal about one axis and the other of said switches actuated by rocking movement of the pedal about said other axis, and interlocking means connectting said switches whereby movement of one switch is controlled by the other switch.

6. A signal device for motor vehicles comprising a foot pedal mounted to rock about axes transverse with respect to each other, a switch box mounted beneath said pedal, a pair of switches in said switch box, one of said switches actuated by rocking movement of said pedal about one axis and the other of said switches actuated by rocking movement of the pedal about said other axis, and mechanical interlock connecting said two switches whereby the movement of said second-named switch is controlled by the movement of the first-named switch.

7. A signal device for motor vehicles comprising a foot pedal mounted for rocking movement about an axis extending longitudinally of the pedal and about another axis extending transversely of the pedal, a switch connected to said pedal and moved thereby in response to pedal movement about its transverse axis, a second switch connected to said pedal and moved therewith in response to movement of the pedal about its longitudinal axis, interlocking means between said two switches, whereby the movement of said second-named switch is controlled by the movement of the pedal about its transverse axis.

8. A signal light system for motor vehicles including a foot-operated pedal, said pedal mounted to rock about a transverse axis, the rocking of said pedal about said axis in a downwardly direction establishing a circuit to light a green light, a rocking of said pedal about said axis in an upward direction effective to establish a circuit to a yellow light, a pair of direction indicating lights, manually operated means to effect the completion of a circuit to one or the other of said directional indicating lights, interlocking means operatively connected to said pedal and to the means for completing the circuit to the direction-indicating lights to interrupt said circuit to said directional signal lights in response to pedal movement in a downwardly direction.

RAYMOND A. RODRICK.